US010301504B2

(12) United States Patent
Keshavaraj

(10) Patent No.: US 10,301,504 B2
(45) Date of Patent: *May 28, 2019

(54) TEXTILE SUBSTRATE WITH A CONTINUOUS COATING OF A MIXTURE OF POLYESTER POLYURETHANE AND POLYCARBONATE POLYURETHANE

(71) Applicant: Milliken & Company, Spartanburg, SC (US)

(72) Inventor: Ramesh Keshavaraj, Peachtree City, GA (US)

(73) Assignee: Milliken & Company, Spartanburg, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/972,735

(22) Filed: Dec. 17, 2015

(65) Prior Publication Data

US 2017/0174168 A1 Jun. 22, 2017

(51) Int. Cl.

| | | |
|---|---|---|
| *B60R 21/215* | (2011.01) | |
| *C09D 175/06* | (2006.01) | |
| *B05D 3/00* | (2006.01) | |
| *C09D 7/40* | (2018.01) | |
| *C09D 175/04* | (2006.01) | |
| *D06M 15/513* | (2006.01) | |
| *D06M 15/564* | (2006.01) | |
| *B60R 21/235* | (2006.01) | |
| *D06N 3/14* | (2006.01) | |

(52) U.S. Cl.
CPC ............ *C09D 175/06* (2013.01); *B05D 3/007* (2013.01); *B60R 21/215* (2013.01); *B60R 21/235* (2013.01); *C09D 7/69* (2018.01); *C09D 175/04* (2013.01); *D06M 15/513* (2013.01); *D06M 15/564* (2013.01); *D06N 3/141* (2013.01); *D06N 3/146* (2013.01); *B60R 2021/23514* (2013.01); *D06M 2200/00* (2013.01); *D06N 2205/023* (2013.01); *D06N 2205/10* (2013.01); *D06N 2211/268* (2013.01)

(58) Field of Classification Search
CPC .......... B05D 3/007; B60R 2021/23514; B60R 21/215; B60R 21/235; C09D 175/04; C09D 175/06; C09D 7/69; D06M 15/513; D06M 15/564; D06M 2200/00; D06N 2205/023; D06N 2205/10; D06N 2211/268; D06N 3/141; D06N 3/146

See application file for complete search history.

(56) References Cited

U.S. PATENT DOCUMENTS

| | | | |
|---|---|---|---|
| 4,945,125 A | 7/1990 | Dillon et al. | 527/427 |
| 5,110,666 A | 5/1992 | Menzel et al. | 428/196 |
| 5,648,426 A | 7/1997 | Zolotnitsky | 525/100 |
| 5,945,186 A | 8/1999 | Li et al. | 428/36.1 |
| 6,169,043 B1 | 1/2001 | Li | 442/71 |
| 6,245,695 B1 | 6/2001 | Maruo et al. | 442/136 |
| 6,348,543 B1 | 2/2002 | Parker | 525/106 |
| 6,451,715 B2 | 9/2002 | Li et al. | 442/76 |
| 6,545,092 B2 | 4/2003 | Parker | 525/106 |
| 6,770,578 B2* | 8/2004 | Veiga | B32B 27/04 106/287.13 |
| 6,825,263 B2* | 11/2004 | Lin | C08L 23/22 524/507 |
| 7,132,170 B2 | 11/2006 | Parker | 428/447 |
| 7,543,843 B2 | 6/2009 | Keshavaraj et al. | 280/728.1 |
| 7,736,702 B1 | 6/2010 | Keshavaraj | 427/389.9 |
| 7,737,058 B2* | 6/2010 | Keshavaraj | C08G 18/0823 442/226 |
| 7,737,059 B1 | 6/2010 | Keshavaraj | 442/226 |
| 9,079,558 B2 | 7/2015 | Crouch | 428/36.2 |
| 2002/0111097 A1 | 8/2002 | Parker | 442/59 |
| 2003/0190429 A1* | 10/2003 | Blackwood | C09D 175/04 427/385.5 |
| 2003/0191232 A1* | 10/2003 | Lin | C08L 23/22 524/588 |
| 2004/0058601 A1 | 3/2004 | Parker | 442/76 |
| 2004/0063803 A1 | 4/2004 | Kim et al. | 522/1 |
| 2005/0100692 A1 | 5/2005 | Parker | 428/34.1 |
| 2006/0217016 A1* | 9/2006 | Lin | B60R 21/235 442/59 |
| 2006/0217018 A1 | 9/2006 | Parker | 442/59 |

FOREIGN PATENT DOCUMENTS

WO WO 99/65677 12/1999

* cited by examiner

*Primary Examiner* — Arti Singh-Pandey
(74) *Attorney, Agent, or Firm* — Cheryl J. Brickey

(57) ABSTRACT

A coated textile substrate containing a textile substrate having an inner side and an outer side and a continuous coating on at least the one side of the textile substrate. The continuous coating comprises a mixture of polyester polyurethane and polycarbonate polyurethane.

12 Claims, No Drawings

TEXTILE SUBSTRATE WITH A CONTINUOUS COATING OF A MIXTURE OF POLYESTER POLYURETHANE AND POLYCARBONATE POLYURETHANE

TECHNICAL FIELD OF THE INVENTION

The invention provides a continuous coating composition suitable for use on airbags, an airbag coated with such a composition, a method for making such an airbag, and an airbag module comprising such an airbag.

BACKGROUND

Airbags for motor vehicles have become ubiquitous in passenger vehicles. These airbags are installed at strategic points in the passenger compartment of a vehicle and, in the event of a collision, are rapidly inflated with gas so that they act as an energy absorbing barrier between the vehicle occupant and an interior surface of the passenger compartment (e.g., steering wheel, dashboard, or windows). For example, side curtain airbags typically are installed within one or more of the pillars of the vehicle so that they provide protection during roll-over or side impact collisions. With the advent of such airbags, manufacturers began coating the airbag textile to modify the gas permeability of the textile, enabling the airbags manufactured from the textile to stay inflated for longer periods of time and provided the needed protection during the collision event.

There are many types of coating compositions used to produce such coated textiles, but one class of coating composition that is quite popular is a dispersion of a polymer in a suitable medium (e.g., aqueous medium). And while these dispersion-based systems are popular, they are not free from drawbacks and difficulties unlike solvent based systems.

Coatings for second impact or rollover side curtain application demand higher level of performance compared frontal airbags in that these curtains are required to hold gas for more than 5 seconds in a rollover event. High coat weights of silicone based elastomers are typically used in such applications where the costing weights range from 65 to 125 GSM. It has been shown that the coat weights can be reduced with high modulus coatings that can retain the performance after aging with careful selection of the material properties. In such examples, polyurethanes made from polycarbonate diol as the soft segment is needed in order to sustain the physical properties after aging. There have been other systems where the stiffness associated with polycarbonate based urethanes were overcome by making a hybrid polyurethane with two diols, namely a polycarbonate and a polyether. Even though the latter system meets the performance requirements, there remains a need to reduce the cost of the polyurethanes and also further improve the properties like stiffness, adhesion, etc.

BRIEF SUMMARY OF THE INVENTION

A coated textile substrate containing a textile substrate having an inner side and an outer side and a continuous coating on at least the outer side of the textile substrate. The continuous coating comprises a mixture of polyester polyurethane and polycarbonate polyurethane.

A process for forming a coated textile containing an aqueous polycarbonate polyurethane dispersion and an aqueous polyester polyurethane dispersion. The polycarbonate polyurethane dispersion contains a plurality of polycarbonate polyurethane particles and aqueous solution and the polycarbonate polyurethane particles have an average particle size of less than about 1 micron. The polyester polyurethane dispersion comprises a plurality of polyester polyurethane particles and aqueous solution and the polyester polyurethane particles have an average particle size less than 5 micron The polycarbonate polyurethane dispersion and the polyester polyurethane dispersion are mixed together forming a physical mixture, where the physical mixture contains between about 5 and 35% by weight polycarbonate polyurethane dispersion and between about 65 and 95% by weight polyester polyurethane dispersion. The physical mixture is coated onto a textile substrate having an inner side and an outer side, where the coating at least covers one side of the textile.

The coated textile is dried using heat, where the heat dries of at least a portion of the aqueous component of the physical mixture and causes the polycarbonate polyurethane particles and polyester polyurethane particles to at least partially melt and bind to each other forming a continuous coating.

DETAILED DESCRIPTION OF THE INVENTION

For gas retention coatings on textile substrates, many different polyurethanes have been explored and tested. A polyurethane formed using a polyester diol is the cheaper compared to polycarbonate or polyether diols, but are inferior when it comes to high temperature and high humidity environments. The polyester backbone is susceptible to degradation in such environments because of the radical type attack because of heat in addition to hydrolysis. The hydrolysis of the ester linkages leads to reduction in the molecular weight of the coating that results in reduced performance of the coating. On the other hand, polycarbonate diol based polyurethanes are known for their excellent strength, hydrolytic stability and oxidative resistance. However the commercial application of this petroleum derived polyol is still limited or small because of the high relative cost compared to the polyether and polyester diols.

It has been found that softer and equally stronger and similar elongation polyurethane can be made by blending softer polyester polyurethane with a much harder polycarbonate polyurethane. It has also been found with proper selection of the polyester diol, in combination with the polycarbonate diol the overall aging performance of the polyester polyurethane can be improved.

In one embodiment, the invention provides an airbag. The airbag can be suitable for use as any airbag in a motor vehicle, such as a frontal impact airbag (e.g., driver or passenger-side frontal impact airbag) or a side impact airbag (e.g., side curtain airbag or side torso airbag). The airbag comprises a textile substrate and a coating on at least a portion of the textile substrate. The airbag can also be configured to enclose an interior volume. For example, the airbag can comprise at least two discrete textile substrates that are sewn, stitched, or otherwise bonded together in such a way as to enclose an interior volume that can be inflated. Alternatively, the airbag can be a one-piece woven airbag, which essentially comprises a textile substrate having two layer areas and single layer areas where the two layers are woven together to enclose an interior volume that can be inflated. Such one-piece woven airbags and suitable constructions for the same are described, for example, in U.S. Pat. Nos. 7,543,609; 7,409,970; 7,069,961; 6,595,244; and 6,220,309.

The textile substrate (of an airbag in some embodiments) can be any suitable textile substrate having an inner side and an outer side. Preferably, the textile substrate is a woven textile. Such woven textiles comprise a plurality of yarns interlaced in a suitable weave pattern, such as a plain weave, twill weave or a satin weave. Preferably, the textile substrate is a woven textile constructed in a plain weave. The woven textile can be constructed from any suitable yarn or combination of yarns. Preferably, the textile substrate is a woven textile comprising a plurality of synthetic yarns. The synthetic yarns can comprise any suitable synthetic fibers. Preferably, the synthetic yarns comprise fibers selected from the group consisting of polyamide fibers (e.g., nylon 6 fibers, nylon 6, 6 fibers), polyester fibers (e.g., polyethylene terephthalate fibers, polytrimethylene terephthalate fibers, polybutylene terephthalate fibers), polyolefin fibers, and mixtures thereof. In a more preferred embodiment, the synthetic yarns comprise fibers selected from the group consisting of polyamide fibers, polyester (PET) fibers, polyolefin fibers, polytrimethylene terephthalate (PTT), and mixtures thereof.

The yarns used in making the textile substrate can have any suitable linear density. Preferably, the yarns have a linear density of about 100 dtex or more or about 110 dtex or more. Preferably, the yarns have a linear density of about 1,500 dtex or less, or about 700 dtex or less. The yarns used in making the textile substrate preferably are multifilament yarns, which means each yarns comprises a plurality of filaments or fibers, such as those mentioned above. In such multifilament yarns, the filaments or fibers preferably have linear densities of about 7 dtex or less, or about 5 dtex or less (e.g., about 4.5 dtex or less).

The textile substrate has a continuous coating on at least the one side of the textile substrate. The continuous coating is a mixture of polyester polyurethane and polycarbonate polyurethane. This mixture is a physical mixture of the two polymers (formed separately and then mixed), not a single polymer backbone containing polyester polyurethane and polycarbonate polyurethane.

The process to form the coated textile begins with separately forming a dispersion of polyester polyurethane and dispersion of polycarbonate polyurethane. The polyester polyurethane dispersion formed is a dispersion of a plurality of polyester polyurethane particles in an aqueous solution. The polyester polyurethane particles preferably have an average particle size less than 5 micrometers, more preferably less than 3 micrometers. In one embodiment, the polyester polyurethane dispersion comprises between about 40 and 75% by weight polyester polyurethane particles.

The polycarbonate polyurethane dispersion formed is a dispersion of a plurality of polycarbonate polyurethane particles in an aqueous solution. The polycarbonate polyurethane particles preferably have an average particle size less than about 1 micrometer, more preferably between about 100 and 800 nanometers. In one embodiment, the polycarbonate polyurethane dispersion comprises between about 25 and 60% by weight polycarbonate polyurethane particles.

The two polyurethane dispersions, the polycarbonate polyurethane dispersion and the polyester polyurethane dispersion are mixed together forming physical mixture, where the physical mixture contains between about 5 and 35% by weight polycarbonate polyurethane and between about 65 and 95% by weight polyester polyurethane. In another embodiment, the physical mixture contains greater than about 50% by weight polyester polyurethane, more preferably greater than about 70% by weight polyester polyurethane. In another embodiment, the physical mixture contains less than about 50% by weight polycarbonate polyurethane, more preferably less than about 30% by weight polycarbonate polyurethane. In one embodiment, the physical mixture contains between about 20 and 30% by weight polycarbonate polyurethane and between about 70 and 80% by weight polyester polyurethane.

The physical mixture is then coated onto the textile substrate such that the coating of the physical mixture at least covers the at least one side of the textile substrate. The coating method used may be any suitable coating method, including but not limited to, gravure coating, knife coating, printing, and transfer coating.

The coated textile substrate is dried using heat which dries off at least a portion of the aqueous component of the coating of the physical mixture forming a dried coating. The heat causes the physical mixture to form into a dried coating and causes at least a portion of the polycarbonate polyurethane particles and the polyester polyurethane particles to melt and bind to each other forming a continuous coating.

In one embodiment, the dried continuous coating has a weight per unit area of less than about 100 grams per square meter, more preferably less than about 50 grams per square meter.

The coated textile substrate may be used for any suitable purpose, especially uses that require air blocking with good environmental ageing. The airbag may be used for any suitable purpose. In one embodiment, the airbag is part of an airbag module, where the airbag enclosing an interior volume and the module also contains a gas generator being connected to the airbag and a cover at least partially enclosing the airbag and gas generator. This airbag and/or airbag module may be used in any suitable device such as a vehicle like a sedan, truck, SUV or airplane.

EXAMPLES

Various combinations of different polyol based polyurethanes were tested for the % retention of the tensile, 100% modulus and elongation properties after high heat and humidity aging conditions. It was found that the mixture of polyester polyurethane and polycarbonate polyurethane with the polyester polyurethane being the minority component that the % retention of material properties of some of the traditional polyester based polyurethanes can be improved to the level of 100% polycarbonate based polyurethane.

This physical mixture method avoids the traditional approach of first making a polyester-polycarbonate diol hybrid through polymerization of the two diols via transesterification reaction. It also allows for each of the polyester based polyurethane and polycarbonate polyurethane to be synthesized via a traditional pre-polymer route or through the acetone stripping route.

The polyester diol used in the preferred polyurethane is a traditional Adipic acid/Neopentyl glycol/1,6-Hexanediol polyester diol with a small amount of the ethylene oxide/propylene oxide polyether for thermal stability. In spite of HDO that is known to increase the hydrolytic resistance, this particular polyurethane lost more than 50% of the ultimate tensile strength after just 1 week of exposure to 70° C./95% RH, and after two weeks under the same condition would only retain 6% of the original. This is an indication of the severity of the test conditions that these materials were exposed to in this particular application.

The polycarbonate side of the polyurethane was made as a hybrid, 80:20 ratio of polycarbonate to polyether polyol. The latter was incorporated to help reduce the 100% modulus of the polycarbonate resin that would result in reducing the stiffness of the coated fabric. In this case, both the polyols were incorporated in the reaction phase of the pre-polymer synthesis. Blending of the pure polycarbonate and polyether polyurethanes that are fully reacted does not produce the same results in terms of the material properties or the stiffness reduction. It is believed that the latter phenomenon is because when blended, the two distinct domains that is persist of the fully reacted products do not ever produce desired properties.

The above two urethanes were blended in various ratios and the films made from each of them were aged under various aging conditions. The % retention of the tensile, elongation and 100% modulus of the films were measured with each of the systems. First each of the polyester and polycarbonate based urethanes were evaluated individually to understand the performance and then the final two candidate for the blend was chosen. Two different types of polyester based PUD's were chosen based on the improved hydrolytic stability behaviors in other applications. Two sets of free films were cast from each of the candidates and one set of the films were aged at 85 C/95 RH conditions for 17 days. Aged films were conditioned for 24 hours before they were tested with the un-aged films at the same time. The blend was found to retain 80% of the above three properties after aging and was very similar to 100% polycarbonate composition.

Commercially available traditional Adipic acid/Neopentyl glycol/1,6-Hexanediol polyester diol based polyester polyurethane with ultimate tensile strength of 6000 Psi, 100% modulus of 578 Psi and ultimate elongation of 610% was chosen to be blended with an 80:20 polycarbonate: polyether polyurethane with ultimate tensile strength of 4263 Psi, 100% modulus of 867 Psi and ultimate elongation of 344%. The chosen blend was coated on OPW airbags and was found to retain at least 25% of the peak pressure seen by the airbag at 6 seconds in both aged and un-aged deployments. This performance is deemed acceptable to restraint an occupant inside a vehicle in a rollover type accident.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

What is claimed is:

1. A coated textile substrate comprising:
   a textile substrate having an inner side and an outer side; and,
   a continuous coating on at least the one side of the textile substrate, wherein the continuous coating comprises a physical mixture of polyester polyurethane and polycarbonate polyurethane, wherein the physical mixture was made by the process of:
   a. forming an aqueous polycarbonate polyurethane dispersion, wherein the polycarbonate polyurethane dispersion comprises a plurality of polycarbonate polyurethane particles and aqueous solution, wherein the polycarbonate polyurethane particles have an average particle size of less than about 1 micron;
   b. forming an aqueous polyester polyurethane dispersion, wherein the polyester polyurethane dispersion comprises a plurality of polyester polyurethane particles and aqueous solution, wherein the polyester polyurethane particles have an average particle size less than 5 microns; and,
   c. mixing the polycarbonate polyurethane dispersion and the polyester polyurethane dispersion together forming a physical mixture, wherein the physical mixture contains between about 5 and 35% by weight polycarbonate polyurethane dispersion and between about 65 and 95% by weight polyester polyurethane dispersion.

2. The coated textile substrate of claim 1, wherein the continuous coating has a weight per unit area of less than about 50 grams per square meter.

3. The coated textile substrate of claim 1, wherein the coating contains greater than about 70% by weight of polyester polyurethane.

4. The coated textile substrate of claim 1, wherein the coating contains less than about 30% by weight of polycarbonate polyurethane.

5. An airbag comprising:
   a textile substrate having an inner side and an outer side and,
   a continuous coating on at least one side of the textile substrate, wherein the continuous coating comprises a physical mixture of polyester polyurethane and polycarbonate polyurethane, wherein the physical mixture was made by the process of:
   a. forming an aqueous polycarbonate polyurethane dispersion, wherein the polycarbonate polyurethane dispersion comprises a plurality of polycarbonate polyurethane particles and aqueous solution, wherein the polycarbonate polyurethane particles have an average particle size of less than about 1 micron;
  b. forming an aqueous polyester polyurethane dispersion, wherein the polyester polyurethane dispersion comprises a plurality of polyester polyurethane particles and aqueous solution, wherein the polyester polyurethane particles have an average particle size less than 5 microns; and,
  c. mixing the polycarbonate polyurethane dispersion and the polyester polyurethane dispersion together forming a physical mixture, wherein the physical mixture contains between about 5 and 35% by weight polycarbonate polyurethane dispersion and between about 65 and 95% by weight polyester polyurethane dispersion.

6. The airbag of claim 5, wherein the continuous coating has a weight per unit area of less than about 50 grams per square meter.

7. The airbag of claim 5, wherein the coating contains greater than about 70% by weight of polyester polyurethane.

8. The airbag of claim 5, wherein the coating contains less than about 30% by weight of polycarbonate polyurethane.

9. A vehicle comprising the airbag of claim 5.

10. An airbag module comprising:
  (a) an airbag, the airbag enclosing an interior volume and comprising:
    a textile substrate having an inner side and an outer side; and, a continuous coating on at least the one side of the textile substrate, wherein the continuous coating comprises a physical mixture of polyester polyurethane and polycarbonate polyurethane, wherein the physical mixture was made by the process of:
    1. forming an aqueous polycarbonate polyurethane dispersion, wherein the polycarbonate polyurethane dispersion comprises a plurality of polycarbonate polyurethane particles and aqueous solution, wherein the polycarbonate polyurethane particles have an average particle size of less than about 1 micron;
    2. forming an aqueous polyester polyurethane dispersion, wherein the polyester polyurethane dispersion comprises a plurality of polyester polyurethane particles and aqueous solution, wherein the polyester polyurethane particles have an average particle size less than 5 microns; and,
    3. mixing the polycarbonate polyurethane dispersion and the polyester polyurethane dispersion together forming a physical mixture, wherein the physical mixture contains between about 5 and 35% by weight polycarbonate polyurethane dispersion and between about 65 and 95% by weight polyester polyurethane dispersion;
  (b) a gas generator, the gas generator being connected to the said airbag; and,
  (c) a cover at least partially enclosing the airbag and the gas generator.

11. The airbag module of claim 10, wherein the coating contains less than about 30% by weight of polycarbonate polyurethane.

12. A vehicle comprising the airbag module of claim 10.

* * * * *